(12) United States Patent
Nikulin

(10) Patent No.: US 10,275,406 B2
(45) Date of Patent: Apr. 30, 2019

(54) SYSTEM AND METHOD FOR RANKING SEARCH RESULTS BASED ON USEFULNESS PARAMETER

(71) Applicant: YANDEX EUROPE AG, Lucerne (CH)

(72) Inventor: Vadim Andreevich Nikulin, Moscow (RU)

(73) Assignee: Yandex Europe AG, Lucerne (CH)

( * ) Notice: Subject to any disclaimer, the term of this patent is extended or adjusted under 35 U.S.C. 154(b) by 268 days.

(21) Appl. No.: 15/252,274

(22) Filed: Aug. 31, 2016

(65) Prior Publication Data
US 2017/0075897 A1   Mar. 16, 2017

(30) Foreign Application Priority Data
Sep. 14, 2015   (RU) ................... 2015139059

(51) Int. Cl.
G06F 16/2457 (2019.01)
G06F 16/9535 (2019.01)

(52) U.S. Cl.
CPC .... G06F 16/24578 (2019.01); G06F 16/9535 (2019.01)

(58) Field of Classification Search
CPC .......... G06F 17/3053; G06F 17/30867; G06F 16/24578; G06F 16/9535
USPC ...................................................... 707/706
See application file for complete search history.

(56) References Cited

U.S. PATENT DOCUMENTS

| 7,831,595 B2 | 11/2010 | Suresh et al. |
| 8,392,394 B1 | 3/2013 | Kumar et al. |
| 8,938,463 B1 * | 1/2015 | Kim .................. G06F 17/30867 707/751 |
| 2003/0120654 A1 | 6/2003 | Edlund et al. |

(Continued)

FOREIGN PATENT DOCUMENTS

| RU | 2419860 C2 | 7/2011 |
| RU | 2435212 C2 | 11/2011 |

(Continued)

OTHER PUBLICATIONS

Slawski, Yahoo's 'Universal Search' and Vertical Search Suggestions, SEO by the Sea, Jan. 23, 2008, 6 pages.

(Continued)

*Primary Examiner* — Evan Aspinwall
(74) *Attorney, Agent, or Firm* — BCF LLP

(57) ABSTRACT

There are disclosed methods and systems for generating a search engine results page (SERP) responsive to receiving a search query. A ranked plurality of search results is generated, including at least one general search result and at least one vertical search result, the ranked plurality of search results having been ranked based at least in part on a usefulness parameter. The usefulness parameter indicates the optimal position of the at least one vertical search result in the ranked plurality of search results based on its determined usefulness relative to the search query. The usefulness parameter is predetermined based on a training set of user data on past user interaction with the at least one vertical search result when its original rank was modified such that the at least one vertical search result was ranked randomly and placed on the previous SERP at a random position.

18 Claims, 4 Drawing Sheets

(56) References Cited

U.S. PATENT DOCUMENTS

| | | | |
|---|---|---|---|
| 2005/0192946 A1* | 9/2005 | Lu | G06F 17/30864 |
| 2006/0004892 A1* | 1/2006 | Lunt | G06F 17/30864 |
| 2006/0224587 A1* | 10/2006 | Zamir | G06F 17/30867 |
| 2007/0276803 A1 | 11/2007 | Shakib et al. | |
| 2009/0106221 A1* | 4/2009 | Meyerzon | G06F 17/30864 |
| 2010/0082582 A1* | 4/2010 | Gao | G06F 17/30867 707/706 |
| 2010/0125570 A1* | 5/2010 | Chapelle | G06F 17/30864 707/722 |
| 2010/0281012 A1 | 11/2010 | Imig et al. | |
| 2011/0072010 A1* | 3/2011 | Wu | G06F 17/30867 707/722 |
| 2011/0131246 A1 | 6/2011 | Diaz | |
| 2011/0218946 A1 | 9/2011 | Stern et al. | |
| 2011/0258149 A1* | 10/2011 | Kanungo | G06F 17/30882 706/12 |
| 2012/0084277 A1 | 4/2012 | Barve et al. | |
| 2013/0054569 A1* | 2/2013 | Mo | G06F 17/30867 707/722 |
| 2013/0246412 A1* | 9/2013 | Shokouhi | G06F 17/30867 707/730 |
| 2016/0224559 A1* | 8/2016 | Hicks | G06F 17/30554 |

FOREIGN PATENT DOCUMENTS

| | | |
|---|---|---|
| WO | 2015028898 A1 | 3/2015 |
| WO | 2015056112 A1 | 4/2015 |
| WO | 2015028897 A1 | 5/2015 |

OTHER PUBLICATIONS

Kumar et al., Model Characterization Curves for Federated Search Using Click-Logs: Predicting User Engagement Metrics for the Span of Feasible Operating Points, WWW 2011, Mar. 28-Apr. 1, 2011, Hyderabad, India, 10 pages.

Kumar et al., On Composition of a Federated Web Search Result Page: Using Online Users to Provide Pairwise Preference for Heterogenous Verticals, pp. 715-724, Feb. 9, 2011.

* cited by examiner

SYSTEM AND METHOD FOR RANKING SEARCH RESULTS BASED ON USEFULNESS PARAMETER

CROSS-REFERENCE

The present application claims priority to Russian Patent Application No. 2015139059, filed Sep. 14, 2015, entitled "A SYSTEM AND METHOD FOR RANKING SEARCH RESULTS BASED ON USEFULNESS PARAMETER", the entirety of which is incorporated herein by reference.

FIELD

The present technology relates to search engines in general and specifically to a method and apparatus for ranking search results and generating a search engine results page (SERP) for a search query.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource he or she is interested in.

When the given user runs a search using the search engine, he or she generally has two priorities. He or she wants the search engine to locate the most relevant results and he or she wants the results relatively quickly. Search results are generally presented to the user on a webpage, such as a search engine results page (SERP). The SERP may contain any number of different types of results gathered from a variety of sources, such as general, textual search results from general internet searches, or particular types of search results (e.g., images) retrieved from vertical searches. Search engines use a variety of methods to determine which search results are most relevant in response to a search query, and how to display such results to the user. Despite the existence of ranking models to determine the selection and placement of search results on a SERP, improvements may still be made in methods and systems for ranking search results, to provide a more satisfactory search experience to the user.

U.S. Patent Application Publication No. 2011/0258149 published on Oct. 20, 2011 to Kanungo et al. teaches methods and computer-storage media having computer-executable instructions embodied thereon that facilitate generating a machine-learned model for ranking search results using click-based data. Data is referenced from user queries, which may include search results generated by general search engines and vertical search engines. A training set is generated from the search results and click-based judgments are associated with the search results in the training set. Based on click-based judgments, identifiable features are determined from the search results in a training set. Based on determining identifiable features in a training set, a rule set is generated for ranking subsequent search results.

International Patent Application Publication No. WO 2015/028898 published on Mar. 5, 2015 to Esinovskaya et al. teaches methods and systems for conducting a search and presenting results. The method comprises receiving a search query from an electronic device associated with a user; responsive to the search query, generating a search query result set, the search query result set including a vertical search result; determining a confidence level that the vertical search result is the most relevant to the search query; and, responsive to the confidence level being above a predetermined threshold, causing the electronic device to display exclusively the vertical search result.

International Patent Application Publication No. WO 2015/056112 published on Apr. 23, 2015 to Karpovich et al. teaches methods and systems for determining a search response to a search query associated with a user. The method comprises determining the most relevant document to the search query by determining a likelihood parameter indicative of how likely the most relevant document is to satisfy the search query; in response to the likelihood being above a threshold, displaying exclusively the most relevant document; and, in response to the likelihood being below the threshold, displaying the general SERP including the most relevant document and other documents.

SUMMARY

It is an object of the present technology to ameliorate at least some of the inconveniences present in the prior art.

In one aspect, non-limiting implementations of the present technology provide a method of generating a search engine results page (SERP). The method can be executable at a server. The method comprises: receiving a search query from an electronic device associated with a user; responsive to the search query, generating a search query result set, the search query result set including a ranked plurality of search results, the ranked plurality of search results including at least one general search result and at least one vertical search result, wherein the ranked plurality of search results have been ranked based at least in part on a usefulness parameter; and, generating the SERP, the SERP displaying the ranked plurality of search results.

The usefulness parameter indicates the optimal position of the at least one vertical search result in the search query result set based on a determined usefulness of the at least one vertical search result relative to the search query, the usefulness parameter having been predetermined based on a training set of user data on past user interaction with the at least one vertical search result.

The usefulness parameter has been predetermined as follows:

i) responsive to having received the search query from a test electronic device associated with a first member of a first test user group (TUG), having performed a previous search and generated a previous SERP, the previous SERP having included a mixed ranking of the at least one general search result and the at least one vertical search result, wherein the original rank of the at least one vertical search result in the mixed ranking was modified to rank the at least one vertical search result randomly, such that the at least one vertical search result was placed on the previous SERP at a first random position;

ii) having displayed the previous SERP on the test electronic device to the first member of the first TUG, analyzing the behavior of the first member of the first TUG with respect to the at least one vertical search result on the previous SERP, the at least one vertical search result having been placed at the first random position on the previous SERP; and, iii) based at least in part on the behavior of the first member of the first TUG with respect to the at least one vertical search result at the first random position on the previous SERP, having determined the usefulness of the at least one vertical search result relative to the search query and generated the usefulness parameter.

In some non-limiting implementations of the present technology, the behavior of the first member of the first TUG with respect to the at least one vertical search result at the first random position on the previous SERP comprises one or more of click-through rate, time spent after click-through, and other click-based data.

In some non-limiting implementations of the present technology, the first random position represents a lower ranking than the original rank of the at least one vertical search result. In alternative non-limiting implementations of the present technology, the first random position represents a higher ranking than the original rank of the at least one vertical search result. In some non-limiting implementations, click-through or time spent after click-through by the first member of the first TUG on the at least one vertical search result having the lower ranking indicates usefulness of the at least one vertical search result. In alternative non-limiting implementations, lack of click-through or time spent after click-through by the first member of the first TUG on the at least one vertical search result having the higher ranking indicates non-usefulness of the at least one vertical search result.

In another aspect, non-limiting implementations of the present technology provide a method wherein the ranked plurality of search results have been ranked based at least in part on the usefulness parameter and a second usefulness parameter, the second usefulness parameter indicating the optimal position of the at least one general search result in the search query result set based on a second determined usefulness of the at least one general search result relative to the search query.

In some non-limiting implementations of the present technology, the second usefulness parameter and the second determined usefulness have been predetermined based on a second training set of user data on past user interaction with the at least one general search result, as follows:

i) responsive to having received the search query from a second test electronic device associated with a second member of a second test user group (TUG), having performed a second previous search and generated a second previous SERP, the second previous SERP having included a second mixed ranking of the at least one general search result and the at least one vertical search result, wherein the original rank of the at least one general search result in the second mixed ranking was modified to rank the at least one general search result randomly, such that the at least one general search result was placed on the second previous SERP at a second random position;

ii) having displayed the second previous SERP on the second test electronic device to the second member of the second TUG, analyzing the behavior of the second member of the second TUG with respect to the at least one general search result on the second previous SERP, the at least one general search result having been placed at the second random position on the second previous SERP; and, iii) based at least in part on the behavior of the second member of the second TUG with respect to the at least one general search result at the second random position on the second previous SERP, having determined the second usefulness of the at least one general search result relative to the search query and generated the second usefulness parameter.

In some non-limiting implementations of the present technology, the behavior of the second member of the second TUG with respect to the at least one general search result at the second random position on the second previous SERP comprises one or more of click-through rate, time spent after click-through, and other click-based data.

In some non-limiting implementations of the present technology, the second random position represents a lower ranking than the original rank of the at least one general search result. In alternative non-limiting implementations of the present technology, the second random position represents a higher ranking than the original rank of the at least one general search result. In some non-limiting implementations of the present technology click-through or time spent after click-through by the second member of the second TUG on the at least one general search result having the lower ranking indicates usefulness of the at least one general search result. In alternative non-limiting implementations of the present technology lack of click-through or time spent after click-through by the second member of the second TUG on the at least one general search result having the higher ranking indicates non-usefulness of the at least one general search result.

In some non-limiting implementations of the present technology, the first TUG and the second TUG are the same; the first member and the second member are the same; the first test electronic device and the second test electronic device are the same; the first previous search and the second previous search are the same, and/or the first previous SERP and the second previous SERP are the same.

In some non-limiting implementations of the present technology, the usefulness parameter has been generated using a machine learning algorithm. In some embodiments, appreciating the usefulness parameter comprised accessing a log, the log including the training set of user data. In some embodiments, the at least one vertical search result was ranked randomly by generating a random number as its intent weight. In further embodiments, the usefulness parameter determines the intent weight of the at least one vertical search result based on its determined usefulness, thereby determining the rank of the at least one vertical search result in the ranked plurality of search results.

In another aspect, non-limiting implementations of the present technology provide a system for generating a search engine results page (SERP), the system comprising a server. The server comprises a communication interface for communication with an electronic device associated with a user via a communication network; a memory storage; and a processor operationally connected with the communication interface and the memory storage. The processor is configured to store objects, in association with the user, on the memory storage. The processor is further configured to: receive a search query from an electronic device associated with a user; responsive to the search query, generate a search query result set, the search query result set including a ranked plurality of search results, the ranked plurality of search results including at least one general search result and at least one vertical search result, wherein the ranked plurality of search results have been ranked based at least in part on a usefulness parameter; and generate the SERP, the SERP displaying the ranked plurality of search results. The usefulness parameter is defined and has been predetermined as described above, the processor being configured to predetermine the usefulness parameter accordingly.

In some non-limiting implementations of the present technology, the processor is further configured to rank the plurality of search results based at least in part on the usefulness parameter and a second usefulness parameter, the second usefulness parameter being defined and having been predetermined as described above, the processor being configured to predetermine the second usefulness parameter accordingly.

In yet another aspect, non-limiting implementations of the present technology provide a method of generating a usefulness parameter for ranking search results. The method is executable at a server. The method comprises: a) receiving a search query from a test electronic device associated with a first member of a first test user group (TUG); b) responsive to the search query, performing a search and generating a test search engine results page (SERP), the test SERP including a mixed ranking of at least one general search result and at least one vertical search result, wherein the original rank of the at least one vertical search result in the mixed ranking is modified to rank the at least one vertical search result randomly, such that the at least one vertical search result is placed on the test SERP at a first random position; c) displaying the test SERP on the test electronic device to the first member of the first TUG; d) analyzing the behavior of the first member of the first TUG with respect to the at least one vertical search result on the test SERP, the at least one vertical search result having been placed at the first random position on the test SERP; e) based at least in part on the behavior of the first member of the first TUG with respect to the at least one vertical search result at the first random position on the test SERP, determining the usefulness of the at least one vertical search result relative to the search query and generating the usefulness parameter, the usefulness parameter indicating the optimal position of the at least one vertical search result on the test SERP based on the determined usefulness of the at least one vertical search result relative to the search query; and, f) storing the usefulness parameter for use in ranking future search results for the search query.

In some non-limiting implementations, the behavior of the first member of the first TUG with respect to the at least one vertical search result at the first random position on the test SERP comprises one or more of click-through rate, time spent after click-through, and other click-based data. The first random position may represent a lower ranking or a higher ranking than the original rank of the at least one vertical search result.

In some non-limiting implementations, the method further comprises generating a second usefulness parameter for ranking search results, the second usefulness parameter indicating the optimal position of the at least one general search result in the test SERP based on a second determined usefulness of the at least one general search result relative to the search query. The second usefulness parameter is generated by: i) responsive to receiving the search query from a second test electronic device associated with a second member of a second test user group (TUG), performing a second search and generating a second test SERP, the second test SERP including a second mixed ranking of the at least one general search result and the at least one vertical search result, wherein the original rank of the at least one general search result in the second mixed ranking is modified to rank the at least one general search result randomly, such that the at least one general search result is placed on the second SERP at a second random position; ii) displaying the second test SERP on the second test electronic device to the second member of the second TUG; iii) analyzing the behavior of the second member of the second TUG with respect to the at least one general search result on the second test SERP, the at least one general search result having been placed at the second random position on the second test SERP; iv) based at least in part on the behavior of the second member of the second TUG with respect to the at least one general search result at the second random position on the second test SERP, determining the second usefulness of the at least one general search result relative to the search query and generating the second usefulness parameter; and, v) storing the second usefulness parameter for use in ranking future search results for the search query.

In some non-limiting implementations, the behavior of the second member of the second TUG with respect to the at least one general search result at the second random position on the second test SERP comprises one or more of click-through rate, time spent after click-through, and other click-based data. The second random position may represent a lower ranking or a higher ranking than the original rank of the at least one general search result.

In some non-limiting implementations, the first TUG and the second TUG are the same; the first member and the second member are the same; the first test electronic device and the second test electronic device are the same; the first search and the second search are the same; and/or the test SERP and the second test SERP are the same.

In some non-limiting implementations, the usefulness parameter is generated using a machine learning algorithm. In some non-limiting implementations, the at least one vertical search result is ranked randomly by generating a random number as its intent weight. The usefulness parameter may, for example, determine the intent weight of the at least one vertical search result based on the determined usefulness, thereby determining the rank of the at least one vertical search result in the ranked plurality of search results.

In another aspect, non-limiting implementations of the present technology provide a system for generating a usefulness parameter, the system comprising a server. The server comprises a communication interface for communication with an electronic device associated with a user via a communication network; a memory storage; and a processor operationally connected with the communication interface and the memory storage. The processor is configured to store objects, in association with the user, on the memory storage. The processor is further configured to generate and store one or more usefulness parameter in accordance with methods and systems described herein.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, an "electronic device" associated with a user (also referred to herein as a "client device") is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the expression "search result item" is intended to include an item on a search results page (i.e., SERP) that is displayed in response to a user search query. By way of example only, an item on a search results page can be, for instance, a web result, an instant answer, a related search result, an advertisement, a tab item, or the like. In one embodiment, for example, a search result item can be a web result, an instant answer, a related search result, an advertisement, a tab item, or the like. Additionally or alternatively, a search result item can include a set of items displayed as a group adjacent to one another on a search results page. For example, a search result item can be a group of images that are positioned adjacent to one another such that the group appears as one search result item. Further, a short sequence of Web (general) or same-vertical results can be presented grouped together in a "block" in a SERP. Such a block may be grouped together vertically (e.g., news) or horizontally (e.g., images) in a SERP.

In the context of the present specification, the expression "query" is intended to include any type of request including one or more search terms that can be submitted to a search engine (or multiple search engines) for identifying search result items, and/or component(s) thereof, based on the search term(s) contained in the query. The search result items or components thereof that are identified by the queries in the data structure are representations of results produced in response to the queries. For example, the search result items can be web results, instant answers, etc.

In the context of the present specification, the expression "general domain" is intended to include general content, for example, indexed internet content or web content. For example, a general domain search is not confined to search a specific category of results but is able to provide all results that best match the query. Such a general (category-independent) search by a search engine may return search results that include non-category specific digital content as well as category specific digital content, such as images, videos, news, shopping, blogs, books, places, discussions, recipes, patents, stocks, timelines, etc., and other digital content that is closely related and directed toward a certain type of digital content. As an example, a general domain search may be a WWW search. A search performed in a general domain generates a "general search result" or "general search result item." Such general search results are also referred to herein as "web results." Typically, a web result includes a website link and a snippet that summarizes content of the website. A user may select a website link of a web result to navigate to the webpage related to the user search query. The terms "general search result" and "general search result item" are used interchangeably herein, as are the terms "search result" and "search result item."

In the context of the present specification, the expression "vertical domain" is intended to include an information domain containing specialized content, such as content of a single type (e.g., media type, genre of content, topicality, etc.). A vertical domain thus includes a specific subset of a larger set of data, for example, a specific subset of web data. For example, a vertical domain may include specific information such as news, images, videos, local businesses, items for sale, weather forecasts, etc. A search performed in a vertical domain generates a "vertical search result" or a "vertical search result item." Such vertical search results are also referred to herein as "verticals" and "vertical results." The terms "vertical search result" and "vertical search result item" are used interchangeably herein.

In the context of the present specification, the expression "plurality of search results" is intended to include a set of more than one search result, where general (e.g., Web) search results and vertical search results are integrated together within the set of search results or on a search results page. For example, vertical search results may be integrated into general (e.g., Web) search results within a search results page, or vice-versa, i.e., general search results may be integrated into vertical search results within a search results page. A "mixed ranking" of search results refers to such a plurality of search results in which general search results and vertical search results have been aggregated and ranked relative to each other.

In the context of the present specification, the expression "usefulness parameter" is intended to include a ranking tool that is based on the determined usefulness of a search result item (e.g., a vertical search result item, a general search result item, etc.) and is used to rank aggregated search results. Generally, the usefulness parameter indicates the optimal position of a particular search result item in a search query result set or in a SERP to maximize the usefulness of the SERP for the user. It will be understood by the person of skill in the art that "usefulness," as determined herein, generally reflects the relevance, importance, interest, and/or applicability of a particular search result item for the user in relation to a search query.

The usefulness parameter is determined based on a training set of user data on user behavior with respect to a particular search result item when the particular search result item is ranked and placed randomly in a search query result set and SERP. For example, a set of search results is generated and ranked according to known or conventional ranking methods (the initial rank given to a particular search result item using such known or conventional methods being referred to herein as the "original rank"). The original rank of the particular search result item is then modified such that the search result item is ranked randomly and placed on the SERP at a random position. Based at least in part on user behavior with respect to the search result item at the random position, the usefulness of the search result item is determined, and the usefulness parameter is generated accordingly.

In some non-limiting implementations of the present technology, the usefulness parameter is determined based on comparing user behavior with respect to the search result item at the random position with user behavior with respect to the search result item at the position determined by the original rank. In alternative non-limiting implementations, the usefulness parameter is determined based on comparing user behavior with respect to the search result item when placed at a plurality of random positions.

In some non-limiting implementations of the present technology, the usefulness parameter is determined based on placing the search result item at one or more random positions on the SERP. The random positions may represent a higher or lower ranking compared to the original rank. It will be appreciated that in some cases, due to the random nature of the ranking modification, the random position may be the same as the position resulting from the original rank. Further, it should be noted that a usefulness parameter may be determined for one or more search result items in a search query result set. Accordingly, one or more usefulness parameters may be used in ranking a plurality of search results.

The behavior of one or more users may be assessed in determining the usefulness parameter of a particular search result item. In the context of the present specification, the expression "test user group (TUG)" refers to a group of users whose behavior is assessed to determine the usefulness parameter of one or more search result item. In some implementations, a particular TUG is used to determine the usefulness parameter of a particular search result item. In alternative implementations, a particular TUG is used to determine the usefulness parameter for a plurality of search result items, including without limitation a plurality of vertical search result items, a plurality of general search result items, and a plurality of search result items that includes a mixture of both general and vertical search result items.

In the context of the present specification, user "behavior" generally refers to a user engaging or interacting (e.g., selecting, clicking, skipping, etc.) with a search result item. Thus a feature of user behavior may be, for example, a number of times a search result item is selected or clicked (e.g., within a particular time period), a click-through rate, a number of times a search result item is selected at a particular position or size within a SERP (e.g., within a particular time frame), time spent reviewing content after click-through, and the like. As such, user behavior can be analyzed to determine where a search result item or component thereof should be optimally placed within a search engine results page (SERP) based on its usefulness for the user. Search result items most relevant or useful for a particular query are generally provided with a higher ranking, i.e., a rank that is stronger or otherwise indicates a higher priority or preference.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
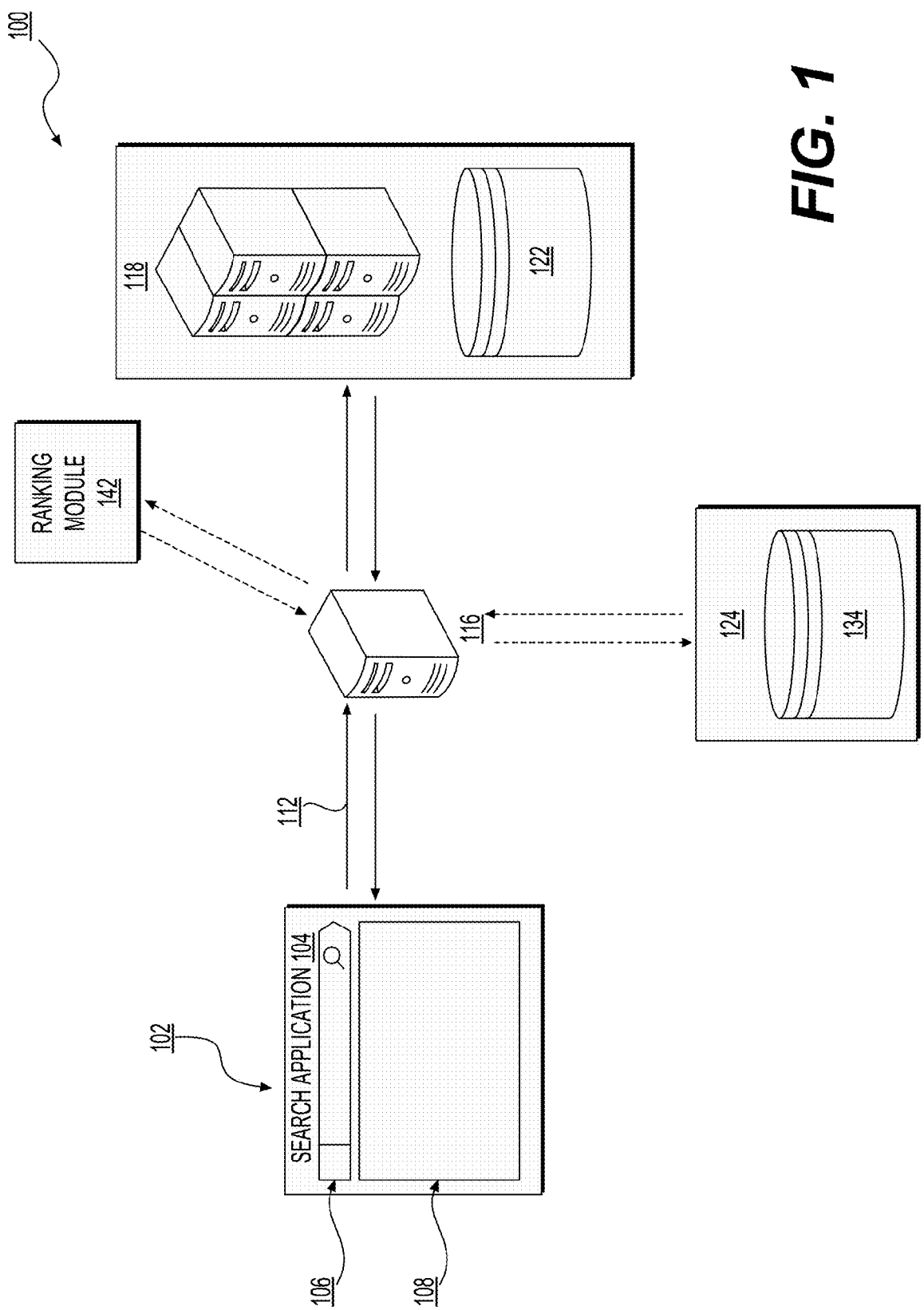
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive search queries and to conduct general and vertical searches in response thereto, as well as to process search results in accordance with non-limiting embodiments of the present technology. As such, any system variation configured to process search results can be adapted to execute embodiments of the present technology, once teachings presented herein are appreciated.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered, or the like.

The implementation of the electronic device 102 is not particularly limited, but as an example, the electronic device 102 may be implemented as a personal computer (desktops, laptops, netbooks, etc.), a wireless communication device (such as a smartphone, a cell phone, a tablet and the like), as well as network equipment (such as routers, switches, and gateways). The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web and vertical searches using the above-mentioned search engine.

How the search application 104 is implemented is not particularly limited. One example of the search application 104 may include a user accessing a web site associated with a search engine to access the search application 104. For example, the search application can be accessed by typing in an URL associated with Yandex™ search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited to) those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally speaking, the search application 104 comprises a search query interface 106 and a search result interface 108 (also referred to herein as a search engine results page, or SERP 108). The general purpose of the search query interface 106 is to enable the user (not depicted) to enter his or her query or a "search string". The general purpose of the search result interface 108 is to provide search results that are responsive to the user search query entered into the search query interface 106. How the user search query is processed and how the search results are presented will be described in detail herein below.

Also coupled to the communication network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware. In the depicted non-limiting embodiments of the present technology, the server 116 is a single server. In alternative non-limiting embodiments of the present technology, the functionality of the server 116 may be distributed and may be implemented via multiple servers.

The electronic device 102 is configured to communicate with the server 116 over a communication link 112. Generally speaking, the communication link 112 enables the electronic device 102 to access the server 116 via a communication network (not depicted). In some non-limiting embodiments of the present technology, the communication network (not depicted) can be implemented as the Internet. In other embodiments of the present technology, the communication network (not depicted) can be implemented differently, such as any wide-area communication network, local-area communication network, a private communication network and the like.

How the communication link 112 is implemented is not particularly limited and will depend on how the electronic device 102 is implemented. Merely as an example and not as a limitation, in those embodiments of the present technology where the electronic device 102 is implemented as a wireless communication device (such as a smartphone), the communication link 112 can be implemented as a wireless communication link (such as but not limited to, a 3G communication network link, a 4G communication network link, Wireless Fidelity, or WiFi® for short, Bluetooth® and the like). In those examples where the electronic device 102 is implemented as a notebook computer, the communication link can be either wireless (such as Wireless Fidelity, or WiFi® for short, Bluetooth® or the like) or wired (such as an Ethernet based connection).

The server 116 is communicatively coupled (or otherwise has access) to a search cluster 118. According to these embodiments of the present technology, the search cluster 118 performs general searches in response to the user search queries inputted via the search query interface 106 and outputs search results to be presented to the user using the search result interface 108. Within these non-limiting embodiments of the present technology, the search cluster 118 comprises or otherwise has access to a database 122. As is known to those of skill in the art, the database 122 stores information associated with a plurality of resources potentially accessible via the communication network (for example, those resources available on the Internet). The process of populating and maintaining the database 122 is generally known as "crawling". It should be expressly understood that in order to simplify the description presented herein below, the configuration of the search cluster 118 has been greatly simplified. It is believed that those skilled in the art will be able to appreciate implementation details for the search cluster 118 and for components thereof.

The server 116 is further communicatively coupled (or otherwise has access) to a vertical search module 124. In the depicted non-limiting embodiment of the present technology, the vertical search module 124 is a single vertical search module. In alternative non-limiting embodiments of the present technology, the server 116 is communicatively coupled (or otherwise has access) to a plurality of vertical search modules (not depicted). For example, merely for the purposes of ease of illustration, vertical search module 124 is implemented as a vertical search module for searching images. Additional vertical search modules for searching additional vertical domains, for example maps and other geographical information, weather-related information, movies and the like, may be included. It should be expressly understood that a number of additional or different services can be implemented as part of the plurality of vertical search modules (not depicted), and that the number of modules within the plurality of vertical search modules is not meant to be limited.

In the depicted non-limiting embodiment of the present technology, vertical search module 124 comprises or has access to one or more database 134. In alternative non-limiting embodiments of the present technology having a plurality of vertical search modules (not depicted), it should be understood that any given one of the plurality of vertical search modules (not depicted) comprises or has access to one or more databases (not depicted). These one or more databases host data associated with the particular services implemented by the given one of the plurality of vertical search modules (not depicted).

For example, to the extent that vertical search module 124 has access to database 134, if the vertical search module 124 implements an images vertical, then the database 134 contains images and related information.

Additionally or optionally and, as known to those skilled in the art, the one or more database 134 may be segregated into one or more separate databases (not depicted). These segregated databases may be portions of the same physical database or may be implemented as separate physical entities. For example, one database within, let's say, the database 134 could host the most popular/most frequently requested images for a given subject, while another database within the database 134 could host all the images available. Needless to say, the above has been provided as an illustration only and several additional possibilities exist for implementing embodiments of the present technology.

The vertical search module 124 is configured to perform vertical searches within the database 134. However, it should be noted that the search capabilities of the vertical search module 124 is not limited to searching the respective database 134 and the vertical search module 124 may perform other searches, as the need may be.

Also, for the purposes of the description presented herein, the term "vertical" (as in vertical search) is meant to connote a search performed on a subset of a larger set of data, the subset having been grouped pursuant to an attribute of data. For example, to the extent that the vertical search module 124 is implemented as an images vertical, the vertical search module 124 searches a subset (i.e., images) of the set of data (i.e., all the data potentially available for searching), the subset of data being stored in the database 134.

Within these embodiments of the present technology, the server 116 is configured to access, separately and independently, the search cluster 118 (to perform a general web search, for example) and the vertical search module 124 (to perform the vertical search of images, for example). In alternative non-limiting embodiments of the present technology, the vertical search module 124 can be implemented as part of the search cluster 118. In those embodiments, the search cluster 118 can be responsible for coordinating and executing both the general web search and the vertical search. In some embodiments of the present technology, the search cluster 118 can execute a multi layer meta search by executing both the general web and the vertical searches.

Within the embodiment depicted in FIG. 1, the server 116 is generally configured to (i) conduct searches (by accessing the search cluster 118 and/or vertical search module 124); (ii) execute analysis of search results and perform ranking of search results; (iii) group search results and compile the search result page (SERP) to be outputted to the electronic device 102. In some implementations, the server 116 may store information and data (e.g., in a database such as database 122), such as user data, usefulness parameters, etc.

According to non-limiting embodiments of the present technology, the server 116 is further configured to perform ranking of search results. Ranking refers generally to identifying an order, position, or placement for search result items and/or components thereof, relative to each other. Search result items most relevant to a particular search query are generally provided with a higher ranking. A higher rank is used to refer to a rank that is stronger or otherwise indicates a higher priority or preference. Rankings can generally be based on any data such as, for example, click-through rates in query logs, history of user(s), query intent, results attributes (e.g., type or category of search results item), and a combination thereof. Rankings are used to determine where search result items or components thereof should be placed within a search results page (SERP). It will be understood by those skilled in the art that rankings may or may not be personalized or user-specific, i.e., they may or may not be based on the user's personal information, such as features of the user's search history.

Those skilled in the art will appreciate that there are various techniques available for ranking and/or personalizing search results. Just as an example and not as a limitation, some of the known techniques for ranking search results by relevancy are based on some or all of: (i) popularity of a given search query or a response thereto; (ii) number of results returned for a search query; (iii) whether the search query contains any determinative terms (such as "images", "movies", "weather" and the like); (iv) how often a particular search query is typically used with determinative terms by other users; and (v) how often other users performing a similar search have selected a particular resource or a particular vertical search results item when results were presented using a standard SERP. It should be understood that any such ranking and/or personalization techniques may be used in addition to, or in combination with, ranking based on the usefulness parameter.

In accordance with embodiments of the present technology, the server 116 is configured to perform ranking of search results based at least in part on a usefulness parameter. To that end, the server 116 comprises or has access to a ranking module 142. The operation of the ranking module 142 within the context of ranking search results based at least in part on a usefulness parameter according to non-limiting embodiments of the present technology will now be described with reference to FIG. 2.

Figure 2:
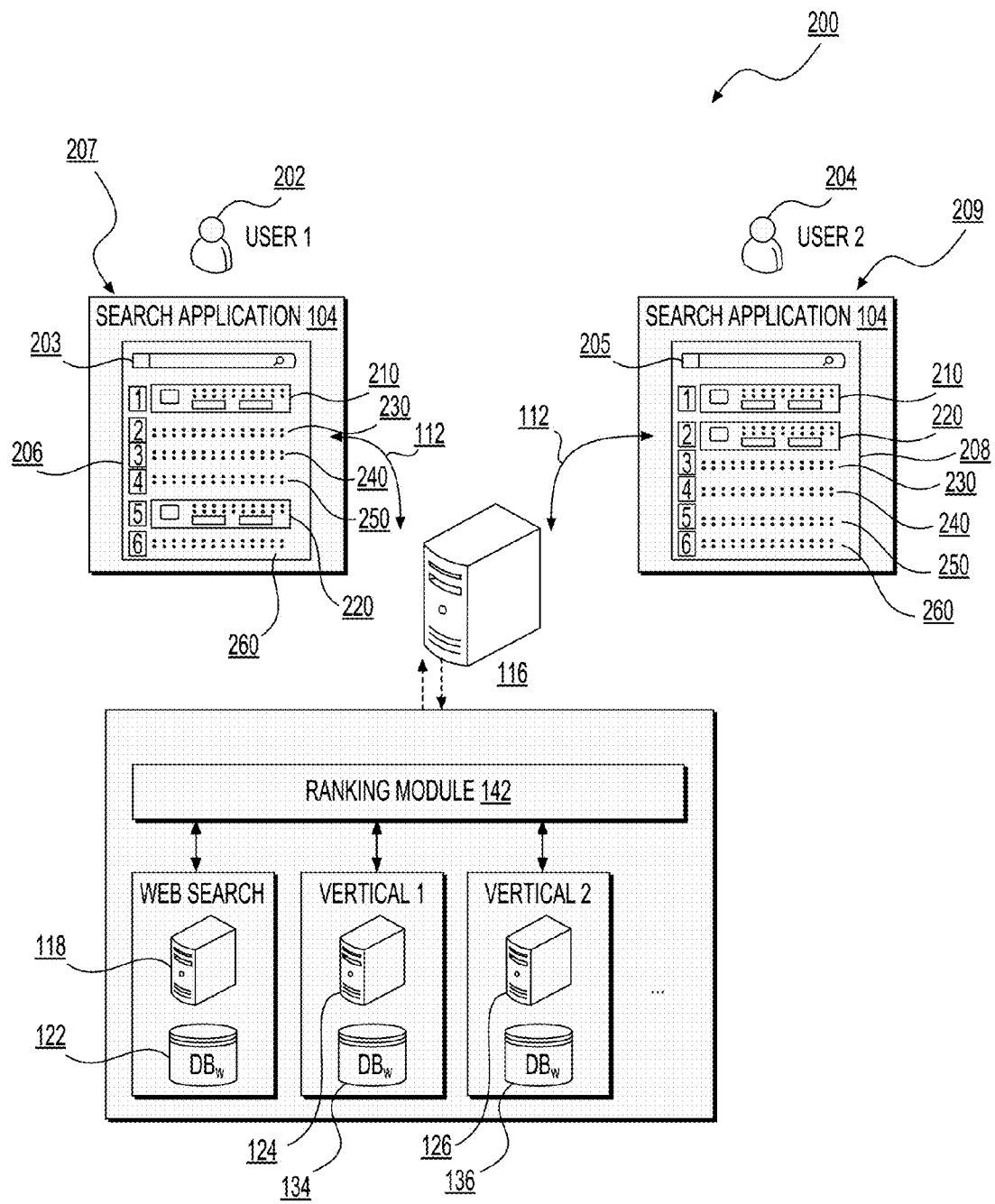
FIG. 2 is a schematic diagram depicting an embodiment of the system of FIG. 1, the system being implemented in accordance with non-limiting embodiments of the present technology.

In order to fully appreciate implementations of the present technology, an example of the system 100 with ranking module 142 is described in greater detail in FIG. 2, which depicts an embodiment 200 of the system 100 in FIG. 1.

In FIG. 2, a first electronic device 207 associated with a first test user ("User 1") 202 and a second electronic device 209 associated with a second test user ("User 2") 204 are depicted. Each electronic device 207, 209 include the search application 104. In the case of the first electronic device 207, the search application 104 includes a first search query interface 203 and a first test search results interface or test SERP 206. In the case of the second test electronic device 209, the search application 104 includes a second search query interface 205 and a second search results interface or test SERP 208. According to non-limiting embodiments of the present technology, there are also provided, displayed in the test search results interface or test SERP 206, 208, in response to the first test user 202 and the second test user 204 having entered the same search query (not depicted) in the search query interface 203, 205, a first general search result item 230, a second general search result item 240, a third general search result item 250, a fourth general search result item 260, a first vertical search result item 210, and a second vertical search result item 220.

It should be noted that the display (e.g., placement, aggregation) of general search result items 230, 240, 250, 260 and vertical search result items 210, 220 on the test search results interface 206, 208 in the embodiment depicted in FIG. 2 is provided for illustrative purposes only, and is not meant to be particularly limited. Many alternative embodiments are possible. As one non-limiting example, vertical search result items 210, 220 can be placed in a distinct area at the top, side, or bottom of the search result page or test SERP 206, 208. In another non-limiting example, vertical search result items 210, 220 may be displayed in a single distinct area. In alternative embodiments of the present technology, the vertical search result items 210, 220 can be split into separate distinct areas and, in a sense, mixed with the rest of the information displayed within test SERP 206, 208. Similarly, in the depicted illustrative embodiment, four general search result items 230, 240, 250, 260 and two vertical search result items 210, 220 are shown, however it should be expressly understood that the number of search result items is not limited.

In the embodiment of the present technology depicted in FIG. 2, in the first test SERP 206 the first vertical search result item 210 is ranked, and displayed accordingly, in the first position, while the second vertical search result item 220 is ranked, and displayed accordingly, in the fifth position. In contrast, in the second test SERP 208, the first vertical search result item 210 remains ranked, and displayed accordingly, in the first position, but the second vertical search result item 220 has been ranked, and displayed accordingly, in the second position, this being a higher ranking than that displayed in the first test SERP 206. This difference in the ranking of the second vertical search result item 220 is due to the random ranking of the second vertical search result item 220 in each of the test SERPs 206, 208.

In the embodiment of the present technology depicted in FIG. 2, the first electronic device 207 and the second electronic device 209 are communicatively coupled (or otherwise have access) with the server 116 via the communication link 112. The server 116 comprises or has access to the ranking module 142 as well as the search cluster 118 associated with database 122, the vertical search module 124 associated with database 134, and a second vertical search module 126 associated with database 136.

It is noted that the ranking module 142 is also communicatively coupled (or otherwise has access) to the search cluster 118 associated with database 122, the vertical search module 124 associated with database 134, and the second vertical search module 126 associated with database 136. In some non-limiting implementations, the ranking module 142 communicates with the search cluster 118, vertical search modules 124, 126, and associated databases 122, 134, 136 via the server 116, as depicted for example in the implementation shown in FIG. 1. In alternative non-limiting implementations, the server 116 comprises the ranking module 142, the server 116 and the ranking module 142 being communicatively coupled with the search cluster 118, vertical search modules 124, 126, and associated databases 122, 134, 136. In still further non-limiting implementations, the server 116 is communicatively coupled with the ranking module 142, the ranking module 142 being communicatively coupled directly (or otherwise having direct access to) the search cluster 118, vertical search modules 124, 126, and associated databases 122, 134, 136. As the person skilled in the art will appreciate, other implementations are possible. It should be expressly understood that the implementation of communication between server 116, ranking module 142, the search cluster 118, vertical search modules 124, 126, and associated databases 122, 134, 136 is not particularly limited.

In some non-limiting implementations, the ranking module 142 further comprises, or is communicatively linked to, a log system (such as a database or other storage module) (not depicted) for storing data and information related to ranking search results, such as general ranking parameters, user data, usefulness parameters, and the like.

Now, we will turn our attention to how the server 116 generates a search engine results page (SERP) 108, in accordance with the present technology. When the user (not depicted) enters a search query (not depicted) into the search query interface 106, the server 116 is configured to acquire an indication of the search query over the communication link 112 and to transmit the search query to one or more of the search cluster 118 and the vertical search modules 124, 126. The ranking module 142 is configured to perform ranking of search results. In one example of a non-limiting embodiment, the ranking module 142 can access a plurality of vertical search modules (124, 126, and others not depicted). The ranking module 142 is configured to rank search results based at least in part on a usefulness parameter (described further below). The server 116 is configured to cause display of the ranked search results on the SERP 108, such as for example, on the electronic device 102.

In some non-limiting implementations, general search results items 230, 240, 250, 260 may be ranked first using known ranking techniques, prior to ranking based on the usefulness parameter. Thus, in some implementations of the present technology, general search results items 230, 240, 250, 260 are ranked based on a general domain-ranking parameter, such as those known in the art, before ranking based on the usefulness parameter.

Similarly, in some non-limiting implementations, vertical search results items 210, 220 are ranked first using known ranking techniques for verticals, prior to ranking based on the usefulness parameter. Thus, in some implementations of the present technology, vertical search results items 210, 220 are ranked based on a vertical domain-ranking parameter, such as those known in the art, before ranking based on the usefulness parameter.

Those skilled in the art will appreciate that general search results items 230, 240, 250, 260 obtained from a search engine are typically ranked using known ranking techniques, e.g., one or more general ranking algorithm, many of which are known in the art, before search results are retrieved or displayed. Similarly, vertical search results items 210, 220 obtained from a search engine are typically ranked using known ranking techniques, e.g., one or more vertical ranking algorithm, many of which are known in the art, before search results are retrieved or displayed. Thus, it should be understood that in some embodiments of the present technology, a first general search result item 230 and a second general search result item 240 have been ranked relative to each other using known ranking techniques, and a first vertical search result item 210 and a second vertical search result item 220 have been ranked relative to each other using known ranking techniques, prior to ranking based on the usefulness parameter. For example, in FIG. 2, the first general search result item 230 is ranked higher than the second general search result item 240, which is ranked higher than the third general search result item 250, which in turn is ranked higher than the fourth general search result item 260. In some embodiments, these rankings may be the result of ranking general search results using a general ranking algorithm, prior to aggregating general and vertical search results and ranking them relative to each other, and prior to ranking based on the usefulness parameter.

Such prior rankings may or may not be personalized, i.e., they may or may not be based on a user-specific ranking attribute. In some implementations, such prior rankings of general search results and/or vertical search results are based on known, general ranking techniques, and are not user-specific. In other implementations, such prior rankings of general search results and/or vertical search results are user-specific, i.e., are based on user-specific general or vertical ranking attributes. User-specific ranking attributes are based on the user's personal information, such as features of the user's search history, and provide personalized rankings.

We will now turn our attention to how the ranking module 142 predetermines the usefulness parameter, in accordance with non-limiting embodiments of the present technology. When a search query (not depicted) is received from the first electronic device 207 associated with the first test user 202 in a first test user group (TUG) (not depicted), a search is performed and a first test SERP 206 is generated, as described above. The first test SERP 206 comprises a mixed ranking of at least one general search result item 230, 240, 250, 260 and at least one vertical search result item 210, 220. In the first test SERP 206, general search result items 230, 240, 250, 260 are ranked respectively in second, third, fourth, and sixth position, and vertical search result items 210, 220 are ranked respectively in first and fifth position. It is noted that the rank of the second vertical search result item 220 has been changed from its original rank (not shown), due to the random ranking. The behavior of the first test user 202 with respect to the second vertical search result item 220 when ranked in the fifth position is then assessed.

When the same search query is received from the second electronic device 209 associated with the second test user 204 in the first TUG, a search is again performed and the second test SERP 208 is generated. The second test SERP 208 also comprises a mixed ranking of the general search result items 230, 240, 250, 260 and the vertical search result items 210, 220. In the second test SERP 208, the rank of the second vertical search result item 220 has again been changed from its original rank (not shown), due to the random ranking. In the embodiment shown in FIG. 2, the rank of the second vertical search result item 220 has been changed from fifth to second in the second test SERP 208. The ranks of the remaining, lower ranked search result items from the first test SERP 206 (general search result items 230, 240, 250, 260 in the embodiment shown in FIG. 2) are adjusted accordingly. The behavior of the second test user 204 with respect to the second vertical search result item 220 when ranked in the second position is then assessed, and optionally compared to the behavior of the first test user 202 with respect to the second vertical search result item 220 when ranked in the fifth position in the first test SERP 206.

Based at least in part on the behavior of the first test user 202 and/or the second test user 204 with respect to the second vertical search result item 220 when ranked in the fifth and second positions, the ranking module 142 is configured to determine the usefulness of the second vertical search result item 220 relative to the search query and generate the usefulness parameter.

For example, the first test user 202 may click on the second vertical search result item 220 ranked in the fifth position on the first test SERP 206, indicating a high usefulness of the second vertical search result item 220 relative to the search query. Additionally or alternatively, the second test user 204 may click on the second vertical search result item 220 on the second test SERP 208, where it is ranked second, again indicating high usefulness. In future searches, the second vertical search result item 220 may then be ranked second (or even higher), based at least in part on the usefulness parameter. Alternatively, the second test user 204 may not click on the second vertical search result item 220 even though it is ranked in the second position. This may indicate a lower usefulness of the second vertical search result item 220 relative to the search query.

It will be appreciated by persons skilled in the art that many such implementations are possible. For example, the first vertical search result item 210 which is ranked in the first position in the first test SERP 206 might have its ranking modified randomly, such that it is displayed in a third SERP (not depicted) in the fifth position. A third user (not depicted) clicking on the first vertical search result item 210 when ranked in the fifth position would indicate high usefulness for the first vertical search result item 210 relative to the search query.

As will be understood by those of skill in the art, many such variations are possible and may be used to determine usefulness and appreciate the usefulness parameter.

In some implementations, the ranking module 142 is configured to rank general search results items 230, 240, 250, 260 first based on a general domain-ranking parameter, before being aggregated with vertical search results items 210, 220 and subsequently ranked according to the usefulness parameter. In the context of the present specification, the expression "general domain-ranking parameter" is intended to include a ranking tool that is used to rank general search results items. Many such ranking tools are known and it should be understood that any such tools may be used in methods and systems provided herein. In one implementation, a general domain-ranking parameter is based on or includes at least one user-specific general ranking attribute. As used herein, the expression "user-specific general ranking attribute" is intended to include any feature or combination of features of the user's search history pertaining to general search results, such as, for example, click-through rates in query logs, navigation history, search history, and the like, that can be analyzed to determine where general search result items, or components thereof, should be placed within a general search results page in accordance with the user's needs or preferences.

Similarly, in some implementations, the ranking module is configured to rank vertical search results items 210, 220 first based on a vertical domain-ranking parameter, before being aggregated with general search results items 230, 240, 250, 260 and subsequently ranked according to the usefulness parameter. In the context of the present specification, the expression "vertical domain-ranking parameter" is intended to include a ranking tool that is used to rank vertical search results items. Many such ranking tools are known and it should be understood that any such tools may be used in methods and systems provided herein. In one implementation, a vertical domain-ranking parameter is based on or includes at least one user-specific vertical ranking attribute. As used herein, the expression "user-specific vertical ranking attribute" is intended to include any feature or combination of features of the user's search history pertaining to vertical search results, such as, for example, click-through rates in query logs, navigation history, search history, and the like, that can be analyzed to determine where vertical search result items, or components thereof, should be placed within a vertical search results page in accordance with the user's needs or preferences.

In accordance with non-limiting embodiments of the present technology, the ranking module 142 is also configured to rank search results based at least in part on a usefulness parameter, the usefulness parameter indicating the optimal position of at least one vertical search result item 210, 220 in a search query result set based on a determined usefulness of the at least one vertical search result item 210, 220 relative to the search query, the ranking module 142 being configured to predetermine the usefulness parameter based on a training set of user data on past user interaction with the at least one vertical search result item 210, 220.

Although the examples described above refer to generation of the usefulness parameter with respect to vertical search result items 210, 220, it should be understood that the present technology is not limited to ranking vertical search results. In some non-limiting implementations, the usefulness parameter may, additionally or alternatively, indicate the optimal position of at least one general search result in the search query result set and be predetermined based on a training set of user data on past user interaction with the at least one general search result. In one non-limiting example, the fourth general search result item 260, which is ranked in the sixth position in the first test SERP 206, could have its ranking modified randomly such that it is ranked in the first position in a fourth SERP (not depicted). If a fourth user (not depicted) nevertheless does not click on the fourth general search result item 260, even though it is placed at the top of the fourth SERP in the first position, this would indicate low usefulness of the fourth general search result item 260 relative to the search query. It should be appreciated that many such variations are possible and may be used to determine usefulness of a general search result relative to a search query and to generate a usefulness parameter.

The number and type of usefulness parameters generated by the ranking module 142 and used in ranking a plurality of search results is not meant to be particularly limited. For example, a usefulness parameter for one or more vertical search result may be used in ranking the search results. Additionally or alternatively, a usefulness parameter for one or more general search result may be used in ranking the search results. Further, where more than one usefulness parameter is generated or used, the plurality of usefulness parameters may be predetermined based on the same training set of user data, or alternatively, may be predetermined based on different training sets of user data, from the same or different test user groups.

Further, although the examples described above refer to users clicking on search result items, it should be understood that other aspects of user behavior may be assessed to determine usefulness and appreciate a usefulness parameter. "User behavior" may include, for example, click-through rate, time spent after click-through, click-through rate on search result items ranked higher or lower than a particular search result item, and other click-based data, many examples of which are known in the art.

Given the architecture described with reference to FIG. 1 and the exemplary embodiment provided in FIG. 2, it is possible to execute a method of generating a search engine results page (SERP) in accordance with the present technology. The method of generating a SERP can be conveniently executed on the server 116. To that end, the server includes computer usable information storage medium storing computer instructions, which instructions when executed, cause the server 116 to execute steps of the method described herein below.

Figure 3:
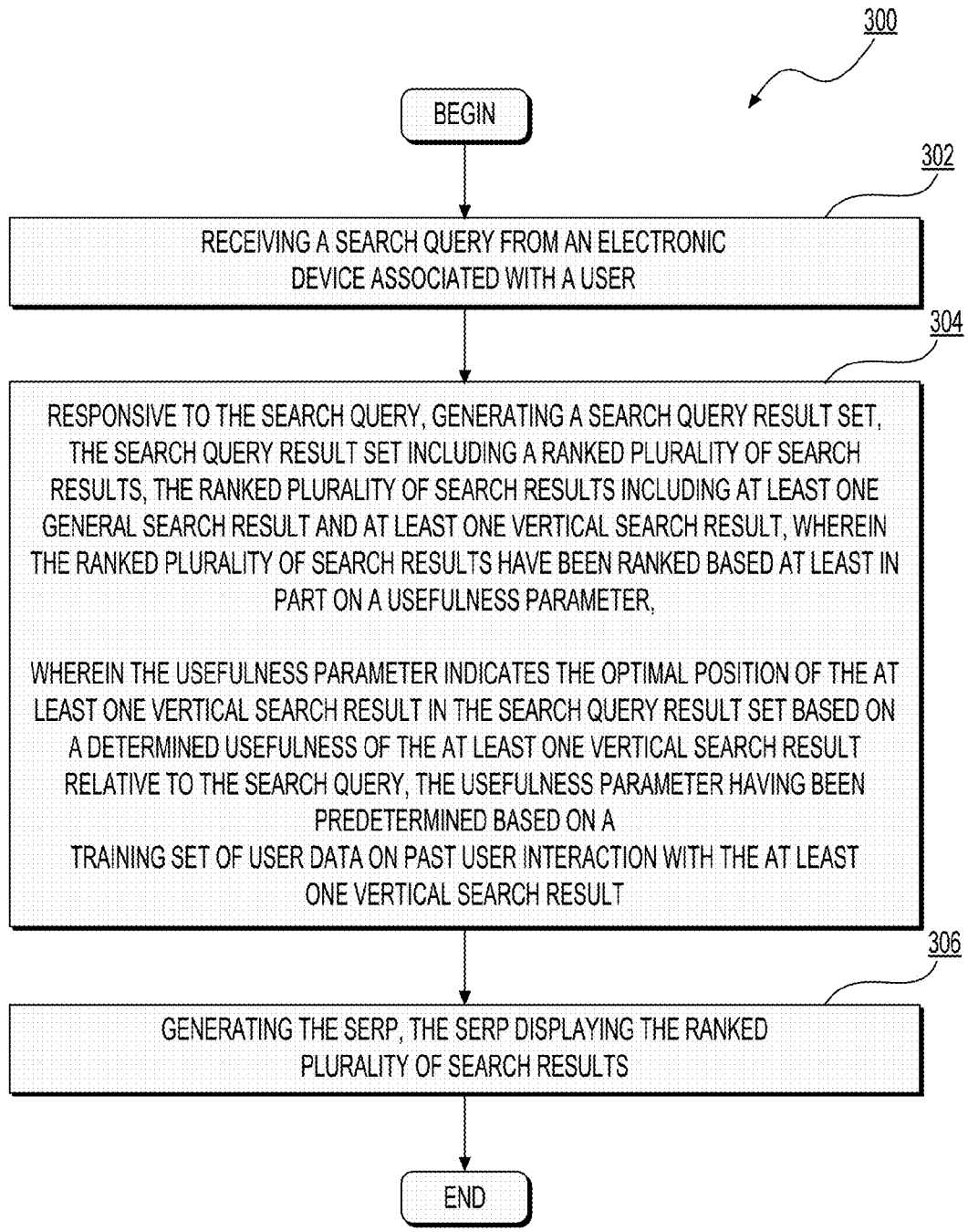
FIG. 3 depicts a block diagram of a method, the method being executable within the system of FIG. 1 and being implemented in accordance with non-limiting embodiments of the present technology.

Reference will now be made to FIG. 3, which depicts a block diagram of a method 300, the method 300 being implemented in accordance with a non-limiting embodiment of the present technology.

Step 302—receiving a search query from an electronic device associated with a user The method 300 begins at step 302, where the server 116 receives a search query from the electronic device 102 associated with the user (not depicted). The step 302 is executed in response to the user entering the search query into the electronic device 102 using the search query interface 106 of the search application 104. The server 116 receives the search query over the communication link 112.

In some non-limiting embodiments of the present technology, the search query is transmitted to the server 116 as a standard URL (i.e., a link) encoded in HTML format. In other embodiments of the present technology, the search query is transmitted in a MYSQ1 script. The latter is particularly useful in, but is not limited to, those non-limiting embodiments where the server 116 is implemented as an SQL server.

The method then proceeds to execution of step 304.

Step 304—responsive to the search query, generating a search query result set, the search query result set including a ranked plurality of search results, the ranked plurality of search results including at least one general search result and at least one vertical search result, wherein the ranked plurality of search results have been ranked based at least in part on a usefulness parameter, wherein the usefulness parameter indicates the optimal position of the at least one vertical search result in the search query result set based on a determined usefulness of the at least one vertical search result relative to the search query, the usefulness parameter having been predetermined based on a training set of user data on past user interaction with the at least one vertical search result In step 304, the server 116 causes the search cluster 118 and the vertical search module 124 to generate a search query result set, the search query result set including a plurality of search results that includes at least one general search result item 230, 240, 250, 260 and at least one vertical search result item 210, 220. As part of executing step 304, the server causes the ranking module 142 to rank the plurality of search results, based at least in part on a usefulness parameter, to generate a ranked plurality of search results.

Figure 4:
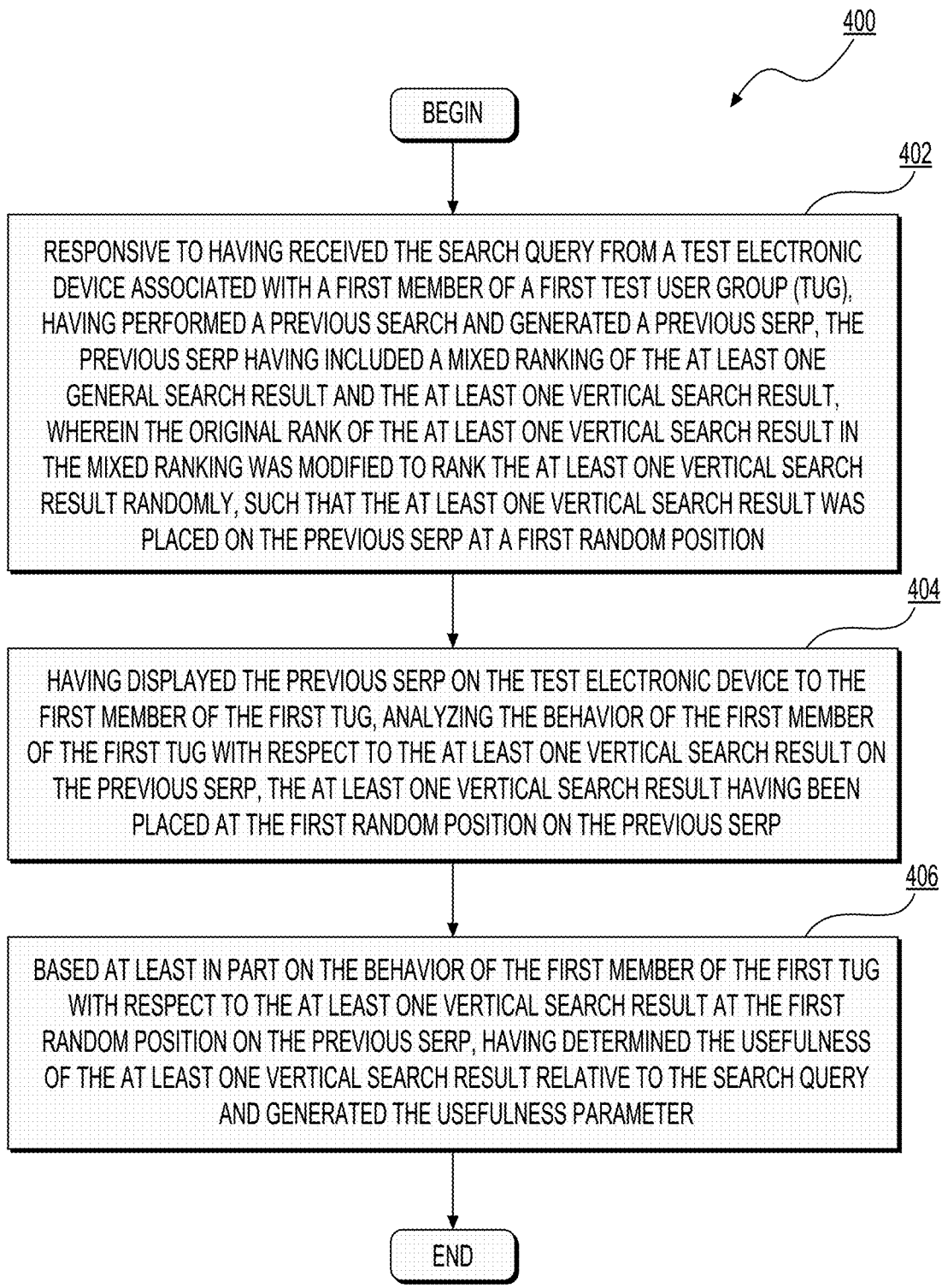
FIG. 4 depicts a block diagram of a method, the method being executable within the system of FIG. 1 and being implemented in accordance with non-limiting embodiments of the present technology.

The usefulness parameter indicates the optimal position of the at least one vertical search result item 210, 220 in the search query result set based on a determined usefulness of the at least one vertical search result item 210, 220 relative to the search query, the usefulness parameter having been predetermined by the ranking module 142 based on a training set of user data on past user interaction with the at least one vertical search result item 210, 220, as described above with reference to FIG. 2, and as described further below with reference to FIG. 4.

In brief, the usefulness parameter has been predetermined based on a training set of user data on past user interaction with the at least one vertical search result item 210, 220, where the original rank of the at least one vertical search result item 210, 220 has been modified randomly. A "training set" refers to a collection of user data referenced from past related search queries by test users 202, 204 in a test user group (TUG). Referenced user data in a training set are judged to determine usefulness of search result items 210, 220, 230, 240, 250, 260 relative to the search query. The training set of data may be judged by a human judge, also referred to herein as an "assessor". An assessor may include a single human judge or multiple judges. Alternatively, the training set of data may be judged using a machine-learned model.

In some non-limiting embodiments of the present technology, usefulness parameters are determined with respect to a single training set of user data for a search query. In alternative non-limiting embodiments, usefulness parameters are determined with respect to multiple training sets of user data for the same search query. Usefulness parameters may, in some embodiments, be determined with respect to a statistical sampling of behavior of past users.

In some non-limiting embodiments of the present technology, the usefulness parameter is generated using a machine learning algorithm. The machine-learned model ranks search results based at least in part on the usefulness parameter, usefulness being determined by assessing test user behavior with respect to a search result item 210, 220, 230, 240, 250, 260 when the search result item is placed at random positions on the test SERP 206, 208. Methods of predetermining the usefulness parameter in Step 304 are explained further below with reference to FIG. 4.

Once the plurality of search results have been ranked, based at least in part on the usefulness parameter, the method 300 then proceeds to execution of step 306.

Step 306—generating the SERP, the SERP displaying the ranked plurality of search results In step 306, the server 116 generates the SERP 108, the SERP 108 displaying the ranked plurality of search results. The server 116 causes the SERP 108 to be displayed on electronic device 102 to the user. The method of displaying the ranked plurality of search results (formatting, presentation, font, color, size, etc.) is not limited. Many such permutations are known and the display will vary depending on factors such as the particular electronic device being used, the particular search request, and the like.

For ease of understanding, reference will now be made to FIG. 4, which provides more detail on the method of predetermining the usefulness parameter, referenced in step 304 of the method 300 above.

With reference to FIG. 4, there is depicted a flow chart of a method 400, the method 400 being implemented in accordance with non-limiting embodiments of the present technology.

Step 402—responsive to having received the search query from a test electronic device associated with a first member of a first test user group (TUG), having performed a previous search and generated a previous SERP, the previous SERP having included a mixed ranking of the at least one general search result and the at least one vertical search result, wherein the original rank of the at least one vertical search result in the mixed ranking was modified to rank the at least one vertical search result randomly, such that the at least one vertical search result was placed on the previous SERP at a first random position The method 400 of predetermining the usefulness parameter begins with step 402. In step 402, responsive to having received the search query from an electronic device (207) associated with a first member (first test user 202) of a first test user group (TUG) (not depicted), the server 116 caused the search cluster 118 and the vertical search module 124, 126 to generate a search query result set, the search query result set including a plurality of search results that included at least one general search result item 230, 240, 250, 260 and at least one vertical search result item 210, 220. The server 116 generated first test SERP 206, first test SERP 206 including a mixed ranking of at least one general search result item 230, 240, 250, 260 and at least one vertical search result item 210, 220, first test SERP 206 being displayed to the first test user 202 on the electronic device 207. In the first test SERP 206, the rank of the at least one vertical search result 220 has been modified randomly to rank the vertical search result item 220 at the fifth position on the first test SERP 206 (referring to the embodiment shown in FIG. 2).

The method 400 now continues with step 404.

Step 404—having displayed the previous SERP on the test electronic device to the first member of the first TUG, analyzing the behavior of the first member of the first TUG with respect to the at least one vertical search result on the previous SERP, the at least one vertical search result having been placed at the first random position on the previous SERP In step 404, having displayed the first test SERP 206 on the test electronic device 207 to the first member 202 of the first TUG, next the behavior of the first member 202 of the first TUG with respect to the at least one vertical search result (vertical search result item 220 in this example) on the first test SERP 206 was assessed. As discussed above, the vertical search result item 220 had been placed at a random position (the fifth position, in the embodiment shown in FIG. 2) on the first test SERP 206.

The method 400 now continues with step 406.

Step 406—based at least in part on the behavior of the first member of the first TUG with respect to the at least one vertical search result at the first random position on the previous SERP, having determined the usefulness of the at least one vertical search result relative to the search query and generated the usefulness parameter In step 406, based at least in part on the behavior of the first member (202) of the first TUG with respect to the at least one vertical search result (second vertical search result item 220, in this example) placed randomly (in fifth position) on the first test SERP 206, the usefulness of the second vertical search result item 220 relative to the search query was determined and the usefulness parameter was generated.

Once generated, the usefulness parameter is stored for future use in ranking search results for the search query. It should be expressly understood that storage of the usefulness parameter is not particularly limited. For example, the usefulness parameter may be stored in a log system (not depicted) that is communicatively linked to, or comprised by, the ranking module 142. A log system may be, for example, a database or other storage module (not depicted) for storing data and information related to ranking search results including usefulness parameters and the like.

As mentioned, above, in some non-limiting embodiments, the usefulness parameter is generated using a machine learning algorithm. In one non-limiting example, a machine-learned usefulness function is used.

For example, the machine-learned usefulness function may be generated as follows: First, a test user group (TUG) is formed. In response to receiving the search query from a test electronic device 209 associated with second test user 204, a member of the TUG, a search is performed and a second test SERP 208 is generated. General and vertical search results items 210, 220, 230, 240, 250, 260 are ranked using known or conventional ranking methods. In some embodiments, vertical ranking factors including intent weights are determined in order to rank the vertical search results items 210, 220. Thus, with reference to the example depicted in FIG. 2, the second vertical result item 220 is given an intent weight to determine its original ranking. In order to modify randomly the ranking of the second vertical result item 220 in the second test SERP 208, a random number is generated as the intent weight for the second vertical result item 220. Thus, general and vertical search results items 210, 220, 230, 240, 250, 260 are ranked using known or conventional ranking methods where a random number is used as the intent weight for the second vertical result item 220, the second vertical result item 220 being placed accordingly at a random position (e.g., at the second position on the second test SERP 208 in the example shown in FIG. 2).

Feedback concerning the behavior of the second test user 204 of the TUG with respect to the second vertical result item 220 placed at the random position in the second test SERP 208 is obtained. For example, the second test user 204 of the TUG may click on the first vertical search result item 210 in the second test SERP 208, which is ranked one position above the second vertical result item 220. It is noted that this might mean the second test user 204 did not see the second vertical result item 220, or it might mean that the second vertical result item 220 was not relevant for the second test user 204 of the TUG. Further analysis may be required to determine the usefulness of the second vertical result item 220. Alternatively, the second test user 204 of the TUG may click on the first general search result item 230, which is ranked one position below the second vertical result item 220 in the second test SERP 208. This may indicate that the second test user 204 of the TUG saw the second vertical result item 220 but did not click on it, indicating that the second vertical result item 220 was not relevant. As another alternative, the second test user 204 of the TUG may click on the second vertical result item 220 in the second test SERP 208 and follow the links from it to web resources, indicating relevance of the second vertical result item 220. Such user data may be used to appreciate the machine-learned usefulness function.

In some cases, user data is stored in a log (not depicted), and the usefulness function is generated by accessing the log. The usefulness function may itself be stored in the log, in which case the usefulness parameter is generated by accessing the usefulness function in the log. Implementation of the log is not particularly limited. For example, the log may be associated with the ranking module 142 or in the database 122, 134.

Continuing with this exemplary embodiment, the machine-learned usefulness function is used to determine an intent weight for the second vertical search result item 220 that optimizes its ranking based on its determined usefulness. The ranking module 142 will then perform mixed ranking of the general and vertical search results items 210, 220, 230, 240, 250, 260 using the determined intent weight and rank the second vertical search result item 220 accordingly. In this way the plurality of search results are ranked taking into account the intent weight determined for the second vertical search result item 220 using the machine-learned usefulness function.

In alternative implementations, general search results are first ranked based on a general domain-ranking parameter, before being aggregated with vertical search results and subsequently ranked based on the usefulness parameter. In the context of the present specification, the expression "general domain-ranking parameter" is intended to include a ranking tool that is used to rank general search results items. Many such ranking tools are known and it should be understood that any such tools may be used in methods and systems provided herein. In one implementation, a general domain-ranking parameter is based on or includes at least one user-specific general ranking attribute.

Similarly, in still further implementations, vertical search results are first ranked based on a vertical domain-ranking parameter, before being aggregated with general search results and subsequently ranked based on the usefulness parameter. In the context of the present specification, the expression "vertical domain-ranking parameter" is intended to include a ranking tool that is used to rank vertical search results items. Many such ranking tools are known and it should be understood that any such tools may be used in methods and systems provided herein.

It should be understood that the way in which the usefulness parameter is used during ranking of the plurality of search results is not meant to be particularly limited. Thus, as outlined above, the usefulness parameter may be used to determine the intent weight for a particular search result item; may be used during mixed ranking of general and vertical search results; may be used after general search results have first been ranked based on general domain-ranking parameters; may be used after vertical search results have first been ranked based on vertical domain-ranking parameters; and so on. The step at which the usefulness parameter is used in the ranking method, or the way in which the usefulness parameter is incorporated into the ranking algorithm, is not particularly limited.

Some technical effects of non-limiting embodiments of the present technology may include provision of an improved, more useful search engine results page (SERP) to the user, in response to the user entering the search query. This provision of an improved SERP can allow the user to delve more deeply into a subject of interest, to find more efficiently or quickly the information he or she is looking for, and the like. Ability for the user to more efficiently find information results in less bandwidth usage. Also, with the electronic device 102 being implemented as a wireless communication device, ability to find information more efficiently would result in conservation of battery power of the electronic device 102. It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

As such, from one perspective, embodiments of the present technology can be summarized as follows, structured in numbered clauses.

CLAUSE 1. A method of generating a search engine results page (SERP) (108), the method executable at a server (116), the method comprising:

a) receiving a search query from an electronic device (102) associated with a user;

b) responsive to the search query, generating a search query result set, the search query result set including a ranked plurality of search results, the ranked plurality of search results including at least one general search result (230, 240, 250, 260) and at least one vertical search result (210, 220), wherein the ranked plurality of search results have been ranked based at least in part on a usefulness parameter; and c) generating the SERP (108), the SERP (108) displaying the ranked plurality of search results;

wherein the usefulness parameter indicates the optimal position of the at least one vertical search result (210, 220) in the search query result set based on a determined usefulness of the at least one vertical search result (210, 220) relative to the search query, the usefulness parameter having been predetermined based on a training set of user data on past user interaction with the at least one vertical search result (210, 220), by:

i) responsive to having received the search query from a test electronic device (207, 209) associated with a first member (202, 204) of a first test user group (TUG), having performed a previous search and generated a previous SERP (206, 208), the previous SERP (206, 208) having included a mixed ranking of the at least one general search result (230, 240, 250, 260) and the at least one vertical search result (210, 220), wherein the original rank of the at least one vertical search result (210, 220) in the mixed ranking was modified to rank the at least one vertical search result (210, 220) randomly, such that the at least one vertical search result (210, 220) was placed on the previous SERP (206, 208) at a first random position;

ii) having displayed the previous SERP (206, 208) on the test electronic device (207, 209) to the first member (202, 204) of the first TUG, analyzing the behavior of the first member (202, 204) of the first TUG with respect to the at least one vertical search result (210, 220) on the previous SERP (206, 208), the at least one vertical search result (210, 220) having been placed at the first random position on the previous SERP (206, 208); and, iii) based at least in part on the behavior of the first member (202, 204) of the first TUG with respect to the at least one vertical search result (210, 220) at the first random position on the previous SERP (206, 208), having determined the usefulness of the at least one vertical search result (210, 220) relative to the search query and generated the usefulness parameter.

CLAUSE 2. The method of clause 1, wherein the behavior of the first member (202, 204) of the first TUG with respect to the at least one vertical search result (210, 220) at the first random position on the previous SERP (206, 208) comprises one or more of click-through rate, time spent after click-through, and other click-based data.

CLAUSE 3. The method of clause 2, wherein the first random position represents a lower ranking than the original rank of the at least one vertical search result (210, 220).

CLAUSE 4. The method of clause 2, wherein the first random position represents a higher ranking than the original rank of the at least one vertical search result (210, 220).

CLAUSE 5. The method of clause 3, wherein click-through or time spent after click-through by the first member (202, 204) of the first TUG on the at least one vertical search result (210, 220) having the lower ranking indicates usefulness of the at least one vertical search result (210, 220).

CLAUSE 6. The method of clause 4, wherein lack of click-through or time spent after click-through by the first member (202, 204) of the first TUG on the at least one vertical search result (210, 220) having the higher ranking indicates non-usefulness of the at least one vertical search result (210, 220).

CLAUSE 7. The method of any one of clauses 1 to 6, wherein the ranked plurality of search results have been ranked based at least in part on the usefulness parameter and a second usefulness parameter, the second usefulness parameter indicating the optimal position of the at least one general search result (230, 240, 250, 260) in the search query result set based on a second determined usefulness of the at least one general search result (230, 240, 250, 260) relative to the search query, the second usefulness parameter and the second determined usefulness having been predetermined based on a second training set of user data on past user interaction with the at least one general search result (230, 240, 250, 260), by:

i) responsive to having received the search query from a second test electronic device associated with a second member (202, 204) of a second test user group (TUG), having performed a second previous search and generated a second previous SERP, the second previous SERP having included a second mixed ranking of the at least one general search result (230, 240, 250, 260) and the at least one vertical search result (210, 220), wherein the original rank of the at least one general search result (230, 240, 250, 260) in the second mixed ranking was modified to rank the at least one general search result (230, 240, 250, 260) randomly, such that the at least one general search result (230, 240, 250, 260) was placed on the second previous SERP at a second random position;

ii) having displayed the second previous SERP on the second test electronic device to the second member (202, 204) of the second TUG, analyzing the behavior of the second member (202, 204) of the second TUG with respect to the at least one general search result (230, 240, 250, 260) on the second previous SERP, the at least one general search result (230, 240, 250, 260) having been placed at the second random position on the second previous SERP; and, iii) based at least in part on the behavior of the second member (202, 204) of the second TUG with respect to the at least one general search result (230, 240, 250, 260) at the second random position on the second previous SERP, having determined the second usefulness of the at least one general search result (230, 240, 250, 260) relative to the search query and generated the second usefulness parameter.

CLAUSE 8. The method of clause 7, wherein the behavior of the second member (202, 204) of the second TUG with respect to the at least one general search result (230, 240, 250, 260) at the second random position on the second previous SERP comprises one or more of click-through rate, time spent after click-through, and other click-based data.

CLAUSE 9. The method of clause 8, wherein the second random position represents a lower ranking than the original rank of the at least one general search result (230, 240, 250, 260).

CLAUSE 10. The method of clause 8, wherein the second random position represents a higher ranking than the original rank of the at least one general search result (230, 240, 250, 260).

CLAUSE 11. The method of clause 9, wherein click-through or time spent after click-through by the second member (202, 204) of the second TUG on the at least one general search result (230, 240, 250, 260) having the lower ranking indicates usefulness of the at least one general search result (230, 240, 250, 260).

CLAUSE 12. The method of clause 10, wherein lack of click-through or time spent after click-through by the second member (202, 204) of the second TUG on the at least one general search result (230, 240, 250, 260) having the higher ranking indicates non-usefulness of the at least one general search result (230, 240, 250, 260).

CLAUSE 13. The method of any one of clauses 7 to 12, wherein the first TUG and the second TUG are the same.

CLAUSE 14. The method of clause 13, wherein the first member (202, 204) and the second member (202, 204) are the same.

CLAUSE 15. The method of clause 14, wherein the first test electronic device (207, 209) and the second test electronic device (207, 209) are the same.

CLAUSE 16. The method of any one of clauses 7 to 15, wherein the first previous search and the second previous search are the same, and the first previous SERP (206, 208) and the second previous SERP (206, 208) are the same.

CLAUSE 17. The method of any one of clauses 1 to 16, wherein the usefulness parameter has been generated using a machine learning algorithm, optionally wherein appreciating the usefulness parameter comprised accessing a log, the log including the training set of user data.

CLAUSE 18. The method of any one of clauses 1 to 17, wherein the at least one vertical search result (210, 220) was ranked randomly by generating a random number as its intent weight.

CLAUSE 19. The method of any one of clauses 1 to 18, wherein the usefulness parameter determines the intent weight of the at least one vertical search result (210, 220) based on the determined usefulness, thereby determining the rank of the at least one vertical search result (210, 220) in the ranked plurality of search results.

CLAUSE 20. A server (116) comprising:

a communication interface for communication with an electronic device (102) associated with a user via a communication network;

a memory storage;

a processor operationally connected with the communication interface and the memory storage, the processor configured to store objects, in association with the user, on the memory storage, the processor being further configured to:

receive a search query from an electronic device (102) associated with a user;

responsive to the search query, generate a search query result set, the search query result set including a ranked plurality of search results, the ranked plurality of search results including at least one general search result (230, 240, 250, 260) and at least one vertical search result (210, 220), wherein the ranked plurality of search results have been ranked based at least in part on a usefulness parameter; and generate the SERP (108), the SERP (108) displaying the ranked plurality of search results;

wherein the usefulness parameter indicates the optimal position of the at least one vertical search result (210, 220) in the search query result set based on a determined usefulness of the at least one vertical search result (210, 220) relative to the search query, the usefulness parameter having been predetermined based on a training set of user data on past user interaction with the at least one vertical search result (210, 220), by:

i) responsive to having received the search query from a test electronic device (207, 209) associated with a first member (202, 204) of a first test user group (TUG), having performed a previous search and generated a previous SERP (206, 208), the previous SERP (206, 208) having included a mixed ranking of the at least one general search result (230, 240, 250, 260) and the at least one vertical search result (210, 220), wherein the original rank of the at least one vertical search result (210, 220) in the mixed ranking was modified to rank the at least one vertical search result (210, 220) randomly, such that the at least one vertical search result (210, 220) was placed on the previous SERP (206, 208) at a first random position;

ii) having displayed the previous SERP (206, 208) on the test electronic device (207, 209) to the first member (202, 204) of the first TUG, analyzing the behavior of the first member (202, 204) of the first TUG with respect to the at least one vertical search result (210, 220) on the previous SERP (206, 208), the at least one vertical search result (210, 220) having been placed at the first random position on the previous SERP (206, 208); and, iii) based at least in part on the behavior of the first member (202, 204) of the first TUG with respect to the at least one vertical search result (210, 220) at the first random position on the previous SERP (206, 208), having determined the usefulness of the at least one vertical search result (210, 220) relative to the search query and generated the usefulness parameter.

CLAUSE 21. The server of clause 20, wherein the behavior of the first member (202, 204) of the first TUG with respect to the at least one vertical search result (210, 220) at the first random position on the previous SERP (206, 208) comprises one or more of click-through rate, time spent after click-through, and other click-based data.

CLAUSE 22. The server of clause 21, wherein the first random position represents a lower ranking than the original rank of the at least one vertical search result (210, 220).

CLAUSE 23. The server of clause 21, wherein the first random position represents a higher ranking than the original rank of the at least one vertical search result (210, 220).

CLAUSE 24. The server of clause 22, wherein click-through or time spent after click-through by the first member (202, 204) of the first TUG on the at least one vertical search result (210, 220) having the lower ranking indicates usefulness of the at least one vertical search result (210, 220).

CLAUSE 25. The server of clause 23, wherein lack of click-through or time spent after click-through by the first member (202, 204) of the first TUG on the at least one vertical search result (210, 220) having the higher ranking indicates non-usefulness of the at least one vertical search result (210, 220).

CLAUSE 26. The server of any one of clauses 20 to 25, wherein the processor is further configured to rank the plurality of search results based at least in part on the usefulness parameter and a second usefulness parameter, the second usefulness parameter indicating the optimal position of the at least one general search result (230, 240, 250, 260) in the search query result set based on a second determined usefulness of the at least one general search result (230, 240, 250, 260) relative to the search query, the second usefulness parameter and the second determined usefulness having been predetermined based on a second training set of user data on past user interaction with the at least one general search result (230, 240, 250, 260), by:

i) responsive to having received the search query from a second test electronic device associated with a second member (202, 204) of a second test user group (TUG), having performed a second previous search and generated a second previous SERP, the second previous SERP having included a second mixed ranking of the at least one general search result (230, 240, 250, 260) and the at least one vertical search result (210, 220), wherein the original rank of the at least one general search result (230, 240, 250, 260) in the second mixed ranking was modified to rank the at least one general search result (230, 240, 250, 260) randomly, such that the at least one general search result (230, 240, 250, 260) was placed on the second previous SERP at a second random position;

ii) having displayed the second previous SERP on the second test electronic device to the second member (202, 204) of the second TUG, analyzing the behavior of the second member (202, 204) of the second TUG with respect to the at least one general search result (230, 240, 250, 260) on the second previous SERP, the at least one general search result (230, 240, 250, 260) having been placed at the second random position on the second previous SERP; and, iii) based at least in part on the behavior of the second member (202, 204) of the second TUG with respect to the at least one general search result (230, 240, 250, 260) at the second random position on the second previous SERP, having determined the second usefulness of the at least one general search result (230, 240, 250, 260) result relative to the search query and generated the second usefulness parameter.

CLAUSE 27. The server of clause 26, wherein the behavior of the second member (202, 204) of the second TUG with respect to the at least one general search result (230, 240, 250, 260) at the second random position on the second previous SERP comprises one or more of click-through rate, time spent after click-through, and other click-based data.

CLAUSE 28. The server of clause 27, wherein the second random position represents a lower ranking than the original rank of the at least one general search result (230, 240, 250, 260).

CLAUSE 29. The server of clause 27, wherein the second random position represents a higher ranking than the original rank of the at least one general search result (230, 240, 250, 260).

CLAUSE 30. The server of clause 28, wherein click-through or time spent after click-through by the second member (202, 204) of the second TUG on the at least one general search result (230, 240, 250, 260) having the lower ranking indicates usefulness of the at least one general search result (230, 240, 250, 260).

CLAUSE 31. The server of clause 29, wherein lack of click-through or time spent after click-through by the second member (202, 204) of the second TUG on the at least one general search result (230, 240, 250, 260) having the higher ranking indicates non-usefulness of the at least one general search result (230, 240, 250, 260).

CLAUSE 32. The server of any one of clauses 26 to 31, wherein the first TUG and the second TUG are the same.

CLAUSE 33. The server of any one of clauses 26 to 32, wherein the first previous search and the second previous search are the same, and the first previous SERP (206, 208) and the second previous SERP (206, 208) are the same.

CLAUSE 34. A method of generating a usefulness parameter for ranking search results, the method executable at a server (116), the method comprising:

a) receiving a search query from a test electronic device (207, 209) associated with a first member (202, 204) of a first test user group (TUG);

b) responsive to the search query, performing a search and generating a test search engine results page (test SERP) (206, 208), the test SERP (206, 208) including a mixed ranking of at least one general search result (230, 240, 250, 260) and at least one vertical search result (210, 220), wherein the original rank of the at least one vertical search result (210, 220) in the mixed ranking is modified to rank the at least one vertical search result (210, 220) randomly, such that the at least one vertical search result (210, 220) is placed on the test SERP (206, 208) at a first random position;

c) displaying the test SERP (206, 208) on the test electronic device (207, 209) to the first member (202, 204) of the first TUG;

d) analyzing the behavior of the first member (202, 204) of the first TUG with respect to the at least one vertical search result (210, 220) on the test SERP (206, 208), the at least one vertical search result (210, 220) having been placed at the first random position on the test SERP (206, 208);

e) based at least in part on the behavior of the first member (202, 204) of the first TUG with respect to the at least one vertical search result (210, 220) at the first random position on the test SERP (206, 208), determining the usefulness of the at least one vertical search result (210, 220) relative to the search query and generating the usefulness parameter, the usefulness parameter indicating the optimal position of the at least one vertical search result (210, 220) on the test SERP (206, 208) based on the determined usefulness of the at least one vertical search result (210, 220) result relative to the search query; and, f) storing the usefulness parameter for use in ranking future search results for the search query.

CLAUSE 35. The method of clause 34, wherein the behavior of the first member (202, 204) of the first TUG with respect to the at least one vertical search result (210, 220) at the first random position on the test SERP (206, 208) comprises one or more of click-through rate, time spent after click-through, and other click-based data.

CLAUSE 36. The method of clause 34 or 35, wherein the first random position represents a lower ranking than the original rank of the at least one vertical search result (210, 220).

CLAUSE 37. The method of clause 34 or 35, wherein the first random position represents a higher ranking than the original rank of the at least one vertical search result (210, 220).

CLAUSE 38. The method of clause 36, wherein click-through or time spent after click-through by the first member (202, 204) of the first TUG on the at least one vertical search result (210, 220) having the lower ranking indicates usefulness of the at least one vertical search result (210, 220).

CLAUSE 39. The method of clause 37, wherein lack of click-through or time spent after click-through by the first member (202, 204) of the first TUG on the at least one vertical search result (210, 220) having the higher ranking indicates non-usefulness of the at least one vertical search result (210, 220).

CLAUSE 40. The method of any one of clauses 34 to 39, further comprising generating a second usefulness parameter for ranking search results, the second usefulness parameter indicating the optimal position of the at least one general search result (230, 240, 250, 260) in the test SERP (206, 208) based on a second determined usefulness of the at least one general search result (230, 240, 250, 260) relative to the search query, wherein the second usefulness parameter is generated by:

i) responsive to receiving the search query from a second test electronic device (207, 209) associated with a second member (202, 204) of a second test user group (TUG), performing a second search and generating a second test SERP (206, 208), the second test SERP (206, 208) including a second mixed ranking of the at least one general search result (230, 240, 250, 260) and the at least one vertical search result (210, 220), wherein the original rank of the at least one general search result (230, 240, 250, 260) in the second mixed ranking is modified to rank the at least one general search result (230, 240, 250, 260) randomly, such that the at least one general search result (230, 240, 250, 260) is placed on the second test SERP (206, 208) at a second random position;

ii) displaying the second test SERP (206, 208) on the second test electronic device (207, 209) to the second member (202, 204) of the second TUG;

iii) analyzing the behavior of the second member (202, 204) of the second TUG with respect to the at least one general search result (230, 240, 250, 260) on the second test SERP (206, 208), the at least one general search result (230, 240, 250, 260) having been placed at the second random position on the second test SERP (206, 208);

iv) based at least in part on the behavior of the second member (202, 204) of the second TUG with respect to the at least one general search result (230, 240, 250, 260) at the second random position on the second test SERP (206, 208), determining the second usefulness of the at least one general search result (230, 240, 250, 260) relative to the search query and generating the second usefulness parameter; and, v) storing the second usefulness parameter for use in ranking future search results for the search query.

CLAUSE 41. The method of clause 40, wherein the behavior of the second member (202, 204) of the second TUG with respect to the at least one general search result (230, 240, 250, 260) at the second random position on the second SERP (206, 208) comprises one or more of click-through rate, time spent after click-through, and other click-based data.

CLAUSE 42. The method of clause 40 or 41, wherein the second random position represents a lower ranking than the original rank of the at least one general search result (230, 240, 250, 260).

CLAUSE 43. The method of clause 40 or 41, wherein the second random position represents a higher ranking than the original rank of the at least one general search result (230, 240, 250, 260).

CLAUSE 44. The method of clause 42, wherein click-through or time spent after click-through by the second member (202, 204) of the second TUG on the at least one general search result (230, 240, 250, 260) having the lower ranking indicates usefulness of the at least one general search result (230, 240, 250, 260).

CLAUSE 45. The method of clause 43, wherein lack of click-through or time spent after click-through by the second member (202, 204) of the second TUG on the at least one general search result (230, 240, 250, 260) having the higher ranking indicates non-usefulness of the at least one general search result (230, 240, 250, 260).

CLAUSE 46. The method of any one of clauses 40 to 45, wherein the first TUG and the second TUG are the same.

CLAUSE 47. The method of clause 46, wherein the first member (202, 204) and the second member (202, 204) are the same.

CLAUSE 48. The method of clause 47, wherein the first test electronic device (207, 209) and the second test electronic device (207, 209) are the same.

CLAUSE 49. The method of any one of clauses 40 to 48, wherein the first search and the second search are the same, and the first test SERP (206, 208) and the second test SERP (206, 208) are the same.

CLAUSE 50. The method of any one of clauses 34 to 49, wherein the usefulness parameter is generated using a machine learning algorithm.

CLAUSE 51. The method of any one of clauses 34 to 50, wherein the at least one vertical search result (210, 220) is ranked randomly by generating a random number as its intent weight.

CLAUSE 52. The method of any one of clauses 34 to 51, wherein the usefulness parameter determines the intent weight of the at least one vertical search result (210, 220) based on the determined usefulness, thereby determining the rank of the at least one vertical search result (210, 220) in the ranked plurality of search results.

The invention claimed is:

1. A method of generating a search engine results page (SERP), the method executable at a server, the method comprising:
    a) receiving, by the server, a search query from an electronic device associated with a user;
    b) responsive to the search query, generating, by the server, a search query result set, the search query result set including at least one general search result and at least one vertical search result;
    c) ranking, by the server, based at least in part on a usefulness parameter, the search query result set to obtain a ranked plurality of search results, the usefulness parameter being indicative of an optimal position of the at least one vertical search result in the ranked plurality of search results; and
    d) generating, by the server, the SERP, the SERP displaying the ranked plurality of search results with the at least one vertical search result being placed at the optimal position;
    wherein the usefulness parameter has been predetermined based on a training set of user data on past user interactions with the at least one vertical search result, by:
        i) previously receiving the search query from a test electronic device associated with a first member of a first test user group (TUG);
        ii) in response to the receiving the search query, generating and ranking a second search query result set to obtain a second ranked plurality of search results, the second ranked plurality of search results including a mixed ranking of the at least one general search result and the at least one vertical search result, the ranking the second search query result set including:
modifying an original rank of the at least one vertical search result to rank the at least one vertical search result randomly;
iii) displaying the second ranked plurality of search results in a previous SERP on the test electronic device associated with the first member of the first TUG, the previous SERP including the at least one vertical search result placed at a first random position;
iv) analyzing user interactions of the first member of the first TUG with respect to the at least one vertical search result on the previous SERP;
v) based at least in part on the user interactions of the first member of the first TUG with respect to the at least one vertical search result at the first random position on the previous SERP, determining a usefulness of the at least one vertical search result relative to the search query; and
vi) generating the usefulness parameter based on the determined usefulness of the at least one vertical search result relative to the search query, the usefulness parameter for determining, in use, the optimal position of the at least one vertical search result.

2. The method of claim 1, wherein the user interactions of the first member of the first TUG with respect to the at least one vertical search result at the first random position on the previous SERP comprises one or more of: a click-through rate, time spent after click-through, and other click-based data.

3. The method of claim 2, wherein the first random position represents a lower ranking than the original rank of the at least one vertical search result.

4. The method of claim 2, wherein the first random position represents a higher ranking than the original rank of the at least one vertical search result.

5. The method of claim 3, wherein the click-through or the time spent after click-through by the first member of the first TUG on the at least one vertical search result having the lower ranking indicates usefulness of the at least one vertical search result.

6. The method of claim 4, wherein lack of the click-through or the time spent after click-through by the first member of the first TUG on the at least one vertical search result having the higher ranking indicates non-usefulness of the at least one vertical search result.

7. The method of claim 1, wherein the ranked plurality of search results have been ranked based at least in part on the usefulness parameter, and a second usefulness parameter, the second usefulness parameter indicating a second optimal position of the at least one general search result in the ranked plurality of search results, the second usefulness parameter having been predetermined based on a second training set of user data on past user interactions with the at least one general search result, by:
i) previously receiving the search query from a second test electronic device associated with a second member of a second TUG;
ii) in response to the receiving the search query, generating and ranking a third search query result set to obtain a third ranked plurality of search results, the third ranked plurality of search results including a second mixed ranking of the at least one general search result and the at least one vertical search result, the ranking the third search query result set including:
modifying a second original rank of the at least one general search result to rank the at least one general search result randomly;
iii) displaying the third ranked plurality of search results in a second previous SERP on the second test electronic device associated with the second member of the second TUG, the second previous SERP including the at least one general search result placed at a second random position;
iv) analyzing user interactions of the second member of the second TUG with respect to the at least one general search result on the second previous SERP;
v) based at least in part on the user interactions of the second member of the second TUG with respect to the at least one general search result at the second random position on the second previous SERP, determining a second usefulness of the at least one general search result relative to the search query; and
vi) generating the second usefulness parameter based on the second determined usefulness of the at least one general search result relative to the search query, the second usefulness parameter for determining, in use, the second optimal position of the at least one general search result.

8. The method of claim 1, wherein the usefulness parameter has been generated using a machine learning algorithm.

9. The method of claim 1, wherein the at least one vertical search result was ranked randomly by generating a random number as its intent weight.

10. The method of claim 1, wherein the usefulness parameter determines an intent weight of the at least one vertical search result based on the determined usefulness, thereby determining the optimal position of the at least one vertical search result in the ranked plurality of search results.

11. A server comprising:
a communication interface for communication with an electronic device associated with a user via a communication network;
a memory storage;
a processor operationally connected with the communication interface and the memory storage, the processor configured to store objects, in association with the user, on the memory storage, the processor being further configured to:
receive a search query from an electronic device associated with a user;
responsive to the search query, generate a search query result set, the search query result set including at least one general search result and at least one vertical search result;
rank, based at least in part on a usefulness parameter, the search query result set to obtain a ranked plurality of search results, the usefulness parameter being indicative of an optimal position of the at least one vertical search result in the ranked plurality of search results; and
generate the SERP, the SERP displaying the ranked plurality of search results with the at least one vertical result placed at the optimal position;
wherein the usefulness parameter has been predetermined based on a training set of user data on past user interactions with the at least one vertical search result, by:
i) previously receiving the search query from a test electronic device associated with a first member of a first test user group (TUG);

ii) in response to the receiving the search query, generating and ranking a second search query result set to obtain a second ranked plurality of search results, the second ranked plurality of search results including a mixed ranking of the at least one general search result and the at least one vertical search result, the ranking the second search query result set including: modifying an original rank of the at least one vertical search result to rank the at least one vertical search result randomly;

iii) displaying the second ranked plurality of search results in a previous SERP on the test electronic device associated with the first member of the first TUG, the previous SERP including the at least one vertical search result placed at a first random position;

iv) analyzing user interactions of the first member of the first TUG with respect to the at least one vertical search result on the previous SERP;

v) based at least in part on the user interactions of the first member of the first TUG with respect to the at least one vertical search result at the first random position on the previous SERP, determining a usefulness of the at least one vertical search result relative to the search query; and vi) generating the usefulness parameter based on the determined usefulness of the at least one vertical search result relative to the search query, the usefulness parameter for determining, in use, the optimal position of the at least one vertical search result.

12. The server of claim 11, wherein the user interactions of the first member of the first TUG with respect to the at least one vertical search result at the first random position on the previous SERP comprises one or more of: a click-through rate, time spent after click-through, and other click-based data.

13. The server of claim 12, wherein the first random position represents a lower ranking than the original rank of the at least one vertical search result.

14. The server of claim 12, wherein the first random position represents a higher ranking than the original rank of the at least one vertical search result.

15. The server of claim 13, wherein the click-through or the time spent after click-through by the first member of the first TUG on the at least one vertical search result having the lower ranking indicates usefulness of the at least one vertical search result.

16. The server of claim 14, wherein lack of the click-through or the time spent after click-through by the first member of the first TUG on the at least one vertical search result having the higher ranking indicates non-usefulness of the at least one vertical search result.

17. The server of claim 11, wherein the processor is further configured to rank the plurality of search results based at least in part on the usefulness parameter and a second usefulness parameter, the second usefulness parameter indicating a second optimal position of the at least one general search result in the ranked plurality of search results, the second usefulness parameter having been predetermined based on a second training set of user data on past user interactions with the at least one general search result, by:

i) previously receiving the search query from a second test electronic device associated with a second member of a second TUG;

ii) in response to the receiving the search query, generating and ranking a third search query result set to obtain a third ranked plurality of search results, the third ranked plurality of search results including a second mixed ranking of the at least one general search result and the at least one vertical search result, the ranking the third search query result set including: modifying a second original rank of the at least one general search result to rank the at least one general search result randomly;

iii) displaying the third ranked plurality of search results in a second previous SERP on the second test electronic device associated with the second member of the second TUG, the second previous SERP including the at least one general search result placed at a second random position;

iv) analyzing user interactions of the second member of the second TUG with respect to the at least one general search result on the second previous SERP;

v) based at least in part on the user interactions of the second member of the second TUG with respect to the at least one general search result at the second random position on the second previous SERP, determining a second usefulness of the at least one general search result relative to the search query; and vi) generating the second usefulness parameter based on the second determined usefulness of the at least one general search result relative to the search query, the second usefulness parameter for determining, in use, the second optimal position of the at least one general search result.

18. A method of generating a usefulness parameter for ranking search results, the method executable at a server, the method comprising:

a) receiving a search query from a test electronic device associated with a first member of a first test user group (TUG);

b) responsive to the search query, performing a search and generating a test search query result set, the test search query result set including at least one general search result and at least one vertical search result;

c) ranking the test search query result set to obtain a test ranked plurality of search results, the test ranked plurality of search results including a mixed ranking of the at least one general search result and the at least one vertical search result, the ranking the test search query result set including: modifying an original rank of the at least one vertical search result to rank the at least one general search result randomly;

d) generating a test SERP displaying the test ranked plurality of search results, the test SERP including the at least one vertical search result placed at a first random position;

e) displaying the test SERP on the test electronic device to the first member of the first TUG;

f) analyzing user interactions of the first member of the first TUG with respect to the at least one vertical search result on the test SERP;

g) based at least in part on the user interactions of the first member of the first TUG with respect to the at least one vertical search result at the first random position on the test SERP, determining the usefulness of the at least one vertical search result relative to the search query;

h) generating the usefulness parameter based on the determined usefulness of the at least one vertical search result relative to the search query, the usefulness parameter for determining, in use, an optimal position of the at least one vertical search result;

i) storing the usefulness parameter for use in ranking future search results for the search query.

* * * * *